(12) United States Patent
Colhoun et al.

(10) Patent No.: US 7,459,113 B2
(45) Date of Patent: Dec. 2, 2008

(54) PROCESS OF MAKING A CONTAINER FROM POLYESTER POLYMER PARTICLES HAVING A SMALL SURFACE TO CENTER INTRINSIC-VISCOSITY GRADIENT

(75) Inventors: Frederick Leslie Colhoun, Kingsport, TN (US); Michael Paul Ekart, Kingsport, TN (US); Mary Therese Jernigan, Kingsport, TN (US); Stephen Weinhold, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 34 days.

(21) Appl. No.: 10/795,783

(22) Filed: Mar. 8, 2004

(65) Prior Publication Data

US 2005/0196566 A1     Sep. 8, 2005

(51) Int. Cl.
 B28B 3/20       (2006.01)
 B29C 47/00      (2006.01)
 B29C 47/78      (2006.01)
 B29C 49/02      (2006.01)

(52) U.S. Cl. .............. 264/176.1; 264/209.1; 264/210.1; 264/292; 264/319

(58) Field of Classification Search .............. 264/176.1, 264/209.1, 210.1, 292, 319
See application file for complete search history.

(56) References Cited

U.S. PATENT DOCUMENTS

| | | | |
|---|---|---|---|
| 3,451,971 A | 6/1969 | Lazarus | |
| 3,624,040 A | 11/1971 | Rath et al. | |
| 3,631,153 A | 12/1971 | Carter et al. | |
| 3,953,404 A | 4/1976 | Borman | |
| 3,960,807 A | 6/1976 | McTaggart | |
| 4,100,142 A | 7/1978 | Schaefer et al. | |
| 4,260,735 A | 4/1981 | Bander et al. | |
| 4,267,310 A * | 5/1981 | Landoll | 524/431 |
| 4,289,871 A | 9/1981 | Rowan et al. | |
| 4,501,878 A | 2/1985 | Adams | |
| 4,613,664 A | 9/1986 | Tate et al. | |
| 4,619,987 A | 10/1986 | Saiki et al. | |
| 4,647,650 A | 3/1987 | Sasaki et al. | |
| 5,409,750 A | 4/1995 | Hamada et al. | |
| 5,442,036 A * | 8/1995 | Beavers et al. | 528/296 |
| 5,444,144 A | 8/1995 | Tanaka et al. | |
| 5,474,111 A | 12/1995 | Williamson et al. | |
| 5,540,868 A | 7/1996 | Stouffer et al. | |
| 5,573,820 A | 11/1996 | Harazoe et al. | |
| 5,648,032 A | 7/1997 | Nelson et al. | |
| 5,714,262 A | 2/1998 | Stouffer et al. | |
| 5,744,074 A * | 4/1998 | Stouffer et al. | 264/8 |
| 5,886,133 A | 3/1999 | Hilbert et al. | |
| 5,898,058 A | 4/1999 | Nichols et al. | |
| 5,902,539 A | 5/1999 | Schmidt et al. | |
| 5,980,797 A | 11/1999 | Shelby et al. | |
| 6,048,957 A | 4/2000 | Ekart et al. | |
| 6,066,713 A | 5/2000 | Mrose et al. | |
| 6,090,898 A | 7/2000 | Tsunekawa et al. | |
| 6,099,778 A | 8/2000 | Nelson et al. | |
| 6,194,536 B1 | 2/2001 | Schmidt et al. | |
| 6,200,659 B1 | 3/2001 | Fujimori et al. | |
| 6,235,228 B1 * | 5/2001 | Nicholl et al. | 264/255 |
| 6,316,584 B1 | 11/2001 | Seidel et al. | |
| 6,320,014 B1 | 11/2001 | Takahashi et al. | |
| 6,335,422 B2 | 1/2002 | Schiavone | |
| 6,339,109 B1 | 1/2002 | Day et al. | |
| 6,344,539 B1 | 2/2002 | Palmer | |
| 6,384,180 B1 | 5/2002 | Jernigan et al. | |
| 6,395,865 B2 | 5/2002 | Schmidt et al. | |

(Continued)

FOREIGN PATENT DOCUMENTS

DE    1950553    4/1970

(Continued)

OTHER PUBLICATIONS

Syang-Peng Rwei, Properties of Poly(Ethylene Terephthalate)/Poly(Ethylene Naphthalate) Blends, Polymer Engineering and Science, Dec. 1999, vol. 39, No. 12, pp. 2475-2481.

(Continued)

*Primary Examiner*—H. T Le
(74) *Attorney, Agent, or Firm*—Dennis V. Carmen; Bernard J. Graves, Jr.

(57) ABSTRACT

There is now provided a polyester polymer particle having an It.V., a surface, and a center, wherein the It.V. at the surface of the particle is less than 0.25 dL/g higher than the It.V. at the center of the particle. The polyester polymer particle is desirably crystalline to prevent the particles from sticking to each other while drying, and desirably contains less than 10 ppm acetaldehyde. A polyester container, preferably a preform or beverage bottle, is made by feeding crystallized polyester particles having an It.V. of at least 0.70 dL/g to an extrusion zone, melting the particles in the extrusion zone to form a molten polyester polymer composition, and forming a sheet or a molded part from extruded molten polyester polymer, wherein at least a portion of the polyester particles have an It.V. at their surface which does not vary from their It.V. at their center by more than 0.25 dL/g, and the particles have not been solid state polymerized. Such polyester compositions have an It.V. suitable for containers, yet lose less It.V. during melt processing than existing polyesters.

57 Claims, No Drawings

U.S. PATENT DOCUMENTS

| | | | |
|---|---|---|---|
| 6,472,500 | B2 | 10/2002 | Dhawan et al. |
| 6,500,915 | B1 | 12/2002 | Fujimori et al. |
| 6,517,762 | B1 | 2/2003 | Tsunekawa et al. |
| 6,559,271 | B2 | 5/2003 | Schaaf et al. |
| 6,586,558 | B2 | 7/2003 | Schmidt et al. |
| 6,613,259 | B2 | 9/2003 | Takahashi et al. |
| 6,616,968 | B2 | 9/2003 | Bostrom et al. |
| 6,669,986 | B1 | 12/2003 | Mushiake et al. |
| 6,703,474 | B2 * | 3/2004 | Fujimori et al. ............. 528/275 |
| 6,710,158 | B2 * | 3/2004 | Edwards et al. ............. 528/275 |
| 6,903,154 | B2 * | 6/2005 | Stafford et al. .............. 524/451 |
| 2001/0034431 | A1 | 10/2001 | Schiavone |
| 2002/0128427 | A1 | 9/2002 | Schaaf et al. |
| 2003/0144459 | A1 | 7/2003 | Fujimori et al. |
| 2005/0065318 | A1 | 3/2005 | Jernigan et al. |
| 2005/0085620 | A1 | 4/2005 | Bruckmann |
| 2005/0154183 | A1 | 7/2005 | Ekart et al. |
| 2005/0196566 | A1 | 9/2005 | Colhoun et al. |
| 2005/0215753 | A1 | 9/2005 | Otto et al. |
| 2006/0046004 | A1 | 3/2006 | Ekart et al. |
| 2006/0149026 | A1 | 7/2006 | Jernigan et al. |
| 2007/0135614 | A1 | 6/2007 | Ekart et al. |

FOREIGN PATENT DOCUMENTS

| | | |
|---|---|---|
| EP | 0492999 | 9/1992 |
| EP | 0661326 | 7/1995 |
| EP | 0661326 A2 | 7/1995 |
| EP | 0699700 A2 | 3/1996 |
| EP | 0774477 | 5/1997 |
| GB | 1337751 | 11/1973 |
| JP | 46-41025 | 12/1971 |
| JP | 46041033 | 12/1971 |
| JP | 47039497 | 11/1972 |
| JP | 47042989 | 12/1972 |
| JP | 48005798 | 1/1973 |
| JP | 48007272 | 3/1973 |
| JP | 48026955 | 4/1973 |
| JP | 48031991 | 10/1973 |
| JP | 48079898 | 10/1973 |
| JP | 48038634 | 11/1973 |
| JP | 48038635 | 11/1973 |
| JP | 48038637 | 11/1973 |
| JP | 49005918 | 1/1974 |
| JP | 49010834 | 1/1974 |
| JP | 49006835 | 2/1974 |
| JP | 49006839 | 2/1974 |
| JP | 49009116 | 3/1974 |
| JP | 48045015 | 4/1974 |
| JP | 49045014 | 4/1974 |
| JP | 50039711 | 4/1975 |
| JP | 51042795 | 4/1976 |
| JP | 51127195 | 11/1976 |
| JP | 52123489 | 10/1977 |
| JP | 52129798 | 10/1977 |
| JP | 52129799 | 10/1977 |
| JP | 53051294 | 5/1978 |
| JP | 53051295 | 5/1978 |
| JP | 53052595 | 5/1978 |
| JP | 53105591 | 9/1978 |
| JP | 54135896 | 10/1979 |
| JP | 54163996 | 12/1979 |
| JP | 55089332 | 7/1980 |
| JP | 55149320 | 11/1980 |
| JP | 56008431 | 1/1981 |
| JP | 57038609 | 8/1982 |
| JP | 58109532 | 6/1983 |
| JP | 60-219226 A | 11/1985 |
| JP | 62-297318 A | 12/1987 |
| JP | 3-146707 A | 6/1991 |
| JP | 3-161509 A | 7/1991 |
| JP | 05-070567 | 3/1993 |
| JP | 7001447 | 1/1995 |
| JP | 1996003301 A | 1/1996 |
| JP | 1996283398 A | 10/1996 |
| JP | 8-325364 A | 12/1996 |
| JP | 1999152324 A | 6/1999 |
| JP | 2000128970 A | 5/2000 |
| JP | 2000128971 A | 5/2000 |
| JP | 2000204145 | 7/2000 |
| JP | 2002322258 A | 11/2002 |
| KR | 1997-0007952 B1 | 5/1997 |
| KR | 2001-0089942 A | 10/2001 |
| NL | 7113206 | 3/1972 |
| WO | WO 92/02569 | 2/1992 |
| WO | WO 01/14452 | 3/2001 |

OTHER PUBLICATIONS

Stefanos L. Sakellarides, The Effect of Isophthalic Acid Modification on the Thermal Crystallization of PET, Antec 1996, pp. 938-942.

Yoshitsugu Maruhashi, Primary Structure and Physical Properties of Poly(ethylene terephthalate)/Poly(ethylene naphthalate) Resin Blends, Polymer Engineering and Science, Jan. 2003, vol. 43, No. 1.

N. Torres, J.J. Rob, B. Boutevin, Study of thermal and mechanical properties of virgin and recycled poly(ethylene terephthalate) before and after injection molding, European Polymer Journal, 1999, pp. 2075-2080.

Darwin PR Kint, Antxon Martinex De Ilarduy, Abdelilah Alla, Sabastian Munoz-Guerra, Poly(ethylene terephthalate) Terpolyesters Containing Isophthalic and 5-tert-Buylisophthalic Units, 2002, pp. 124-134.

Darwin PR Kint, Antxon Martinez De Ilarduya, Sebastian Munoz-Guerra, Poly(ethylene terephthalate) Copolymers Containing 5-tert-Butyl Isophthalic Units, 2001, pp. 1994-2004.

Darwin PR Kint, Abdelilah Alla, Elise Deloret, Josefina L. Campos, Sebastian Munoz-Guerra, Synthesis, characterization and properties of poly(ethylene terephthalate)/poly(1,4-butylene succinate) block copolymers, 2002, pp. 1321-1330.

Darwin PR Kint, Antxou Martinez De Ilarduya, Antoni Sansalvado, Josep Ferrer, Jose I. Iribarren, Sebastian Munoz-Guerra, Structural Characterization and Thermal Properties of Poly(ethylene terephthalate) Copolymers Containing 2-Butyl-2-ethyl-1,3-propanediol, Journal of Applied Polymer Science, vol. 86 1077-1086, 2002, Wiley Periodicals, Inc.

Yongjian Liu, Crystallization and Melting Behavior of Liquid Crystalline Co-polyesters Based on Modified Poly-[(p-hydroxybenzoic acid)-co-(ethylene terephthalate)], Macromolecular Chemistry and Physics, 2001, 202 No. 4; Wiley-VCH; pp. 488-494.

Jinshu Yu, Der Zhou, and Veimin Chai, Synthesis and Non-Isothermal Crystallization Behavior of Poly(ethylene-co-1,4-butylene terephthalate)s, Macromolecular Research, vol. 11, No. 1 pp. 25-25, 2003.

Eun Jae Hyun, So Hwa Lee, Yeong Soon Gal, Sang Hee Jang, Hyun Kuk Choi, Boo Young Shin, Gil Soo Sur, and Bong Shik Kim, A Study on Fabrication of Polyester Copolymers (IV)—Physical Properties of PET/BPA Copolymer-, Polymer (Korea), vol. 25, No. 2, pp. 208-217, 2001. Korean Article Available Only.

Copy of the International Search report from co-pending U.S. Appl. No. 11/018,119, filed Dec. 21, 2004.

Co-pending U.S. Appl. No. 11/018,119, filed Dec. 21, 2004.

Co-pending U.S. Appl. No. 11/018,357, filed Dec. 21, 2004.

Co-pending U.S. Appl. No. 11/454,271, filed Jun. 16, 2006.

Office Action dated Jun. 4, 2007 from co-pending U.S. Appl. No. 11/018,119.

Office Action dated Feb. 2, 2007 from co-pending U.S. Appl. No. 11/018,357.

Office Action dated Sep. 22, 2006 from co-pending U.S. Appl. No. 11/018,357.

Office Action dated Jan. 10, 2006 from co-pending U.S. Appl. No. 11/018,357.

Office Action dated Aug. 2, 2007 from co-pending U.S. Appl. No. 11/454,271.
European Search Report.
USPTO Office Action dated Aug. 2, 2007 for copending U.S. Appl. No. 11/454,271.
USPTO Office Action dated Mar. 17, 2008 for copending U.S. Appl. No. 11/454,271.
USPTO Office Action dated Jan. 17, 2006 for copending U.S. Appl. No. 11/018,357.
USPTO Office Action dated Sep. 22, 2006 for copending U.S. Appl. No. 11/018,357.
USPTO Office Action dated Feb. 2, 2007 for copending U.S. Appl. No. 11/018,357.
USPTO Office Action dated Sep. 26, 2007 for copending U.S. Appl. No. 11/018,357.
USPTO Office Action dated Nov. 23, 2007 for copending U.S. Appl. No. 11/018,357.
USPTO Office Action dated Sep. 7, 2006 for copending U.S. Appl. No. 11/018,119.
USPTO Office Action dated Jun. 4, 2007 for copending U.S. Appl. No. 11/018,119.
USPTO Office Action dated Feb. 15, 2008 for copending U.S. Appl. No. 11/018,119.

* cited by examiner

PROCESS OF MAKING A CONTAINER FROM POLYESTER POLYMER PARTICLES HAVING A SMALL SURFACE TO CENTER INTRINSIC-VISCOSITY GRADIENT

1. FIELD OF THE INVENTION

This invention relates to polyester polymer pellets suitable for use in the manufacture of polyester containers, and more specifically, to polyester polymer particles having a small surface to center molecular weight gradient.

2. BACKGROUND OF THE INVENTION

Polyester polymer pellets, and in particular polyethylene terephthalate homopolymers and copolymers (PET), experience a loss of intrinsic viscosity (It.V.) during melt processing in, for example, an injection molding extruder. As a result of losing It.V., the physical properties of the polymer also degrade. One cause of It.V. loss is the hydrolytic degradation of the polymer caused by water absorbed in the polymer prior to melt processing. To prevent hydrolysis, the polymer is thoroughly dried prior to melt processing. While drying the polymer reduces the loss of It.V., nevertheless, some drop in It.V. is experienced, thereby requiring the use of a polymer having an It.V. higher than the target container It.V. to compensate for It.V. losses during extrusion. The use of higher than target It.V. polymers has the added disadvantage of higher costs due to more energy consumption required to heat the polymer for a longer time and to agitate a more viscous material, and/or due to the extension of the residence time during melt phase polymerization to bring the It.V. up to the desired level, resulting in a decreased production rate. The use of higher than target It.V. polyester polymers also has the disadvantage of requiring more energy to feed the polymer along the screw in the extruder.

It would be desirable to reduce the loss in It.V. experienced by the polyester polymer during melt processing for making containers.

3. SUMMARY OF THE INVENTION

We have discovered a polyester composition that has an It.V. suitable for containers, yet loses less It.V. during melt processing than existing polyesters.

There is now provided a polyester polymer particle comprising a polyester polymer comprising:
(a) a carboxylic acid component comprising at least 90 mole % of the residues of terephthalic acid, derivates of terephthalic acid, naphthalene-2,6-dicarboxylic acid, derivatives of naphthalene-2,6-dicarboxylic acid, or mixtures thereof, and
(b) a hydroxyl component comprising at least 90 mole % of the residues of ethylene glycol, based on 100 mole percent of the carboxylic acid component residues and 100 mole percent hydroxyl component residues in the polyester polymer, wherein said particle has an It.V. of at least 0.7 dL/g, and the It.V. at the surface of the particle is less than 0.25 dL/g higher than the It.V. at the center of the particle.

There is also provided a polyester particle having a degree of crystallinity of at least 25% and an It.V. of at least 0.70 dL/g, said particle having an It.V. at its surface and an It.V. at its center, wherein the It.V. at the surface of the particle is less than 0.25 dL/g higher than the It.V. at the center of the particle.

In addition, there is provided a process for making a polyester container, comprising feeding polyester particles having a degree of crystallinity of at least 15% and an It.V. of at least 0.70 dL/g to an extrusion zone, melting the particles in the extrusion zone to form a molten polyester polymer composition, and forming a sheet or a molded part from extruded molten polyester polymer, wherein the polyester particles fed to the extrusion zone have an It.V. at their surface which is less than 0.25 dL/g higher than the It.V. at their center.

In yet another embodiment, there is provided polyester particles having a particle weight of greater than 1.0 g per 100 particles and less than 100 g per 100 particles, said particles comprising at least 75% virgin polyester polymer comprising:
(a) a carboxylic acid component comprising at least 90 mole % of the residues of terephthalic acid, or derivates of terephthalic acid, or mixtures thereof, and
(b) a hydroxyl component comprising at least 90 mole % of the residues of ethylene glycol, based on 100 mole percent of the carboxylic acid component residues and 100 mole percent hydroxyl component residues in the polyester polymer, the particles having a degree of crystallinity of at least 25%, an It.V. of at least 0.77 dL/g, an It.V. at their surface and an It.V. at their center wherein the It.V. at the surface of the particles is not greater than 0.15 dL/g higher than the It.V. at the center of the particles, and having an acetaldehyde level of 10 ppm or less.

4. DETAILED DESCRIPTION OF THE INVENTION

The present invention may be understood more readily by reference to the following detailed description of the invention and the examples provided therein. It must also be noted that, as used in the specification and the appended claims, the singular forms "a," "an" and "the" include plural referents unless the context clearly dictates otherwise. For example, reference to processing or making a "polymer," a "particle," "preform," "article," "container," or "bottle" is intended to include the processing or making of singular and a plurality of polymers, preforms, articles, containers or bottles. References to a composition containing "an" ingredient or "a" polymer is intended to include other ingredients or other polymers, respectively, in addition to the one named.

By "comprising" or "containing" is meant that at least the named compound, element, particle, or method step etc must be present in the composition or article or method, but does not exclude the presence of other compounds, catalysts, materials, particles, method steps, etc, even if the other such compounds, material, particles, method steps etc. have the same function as what is named, unless expressly excluded in the claims.

It is also to be understood that the mention of one or more method steps does not preclude the presence of additional method steps before or after the combined recited steps or intervening method steps between those steps expressly identified. Moreover, the lettering of process steps is a convenient means for identifying discrete activities or steps, and unless otherwise specified, recited process steps can be arranged in any sequence. Moreover, unless specifically stated, the recited steps can be carried out in any sequence.

A stated range includes all integers and fractions thereof within the range.

A polyester polymer composition is any thermoplastic polyester polymer in any state (e.g. solid or molten), and in any shape, each as the context in which the phrase is used dictates, and includes the composition of matter resulting from the melt phase, or as a solid, or the molten composition of matter in an extrusion zone, a sheet or bottle preform, or in the form of a stretch blow molded bottle. The polyester polymer composition may contain any type and number of additives.

The intrinsic viscosity values described throughout this description to describe the pellet It.V. are set forth in dL/g units as calculated from the inherent viscosity measured at 25° C. in 60/40 wt/wt phenol/tetrachloroethane.

The It.V. of the pellets is determined by measuring the weight-average molecular weight of the polyester by gel permeation chromatography (GPC) from which the It.V. can be calculated as described below. The GPC analysis is used to estimate the molecular weight of the polyester pellets for determining the molecular weight gradient from the surface to the center of the particles:

Solvent: 95/5 by volume methylene chloride/hexafluoroisopropanol
+0.5 g/L tetraethylammonium bromide
Temperature: ambient
Flow rate: 1 mL/min
Sample Solution:
4 mg polyester polymer in 10 mL methylene chloride/hexafluoroisopropanol azeotrope (~70/30 by vol)+10 μl toluene flow rate marker. For filled materials, the sample mass is increased so that the mass of polymer is about 4 mg, and the resulting solution is passed through a 0.45 μm Teflon filter.
Injection volume: 10 μL
Column set: Polymer Laboratories 5 μm PLgel, Guard+ Mixed C
Detection: UV absorbance at 255 nm
Calibrants: monodisperse polystyrene standards, MW=580 to 4,000,000 g/mole, where MW is the peak molecular weight
Universal calibration parameters:

PS K=0.1278 a=0.7089

PET K=0.4894 a=0.6738

The universal calibration parameters are determined by linear regression to yield the correct weight average molecular weights for a set of five polyester polymer samples previously characterized by light scattering.

The calculation of inherent viscosity at 0.5 g/dL in 60/40 phenol/tetrachloroethane from the weight-average molecular weight, $<M>_w$, is determined as follows:

$$Ih.V. = 4.034 \times 10^{-4} <M>_w^{0.691}$$

The intrinsic viscosity (It.V. or $\eta_{int}$) may then be calculated from the inherent viscosity using the Billmeyer equation as follows:

$$It.V. = 0.5[e^{0.5 \times Ih.V.} - 1] + (0.75 \times Ih.V.)$$

The solution viscosity relates to the composition and molecular weight of a polyester polymer. Although the IhV numbers for the crystallized products to determine the molecular weight gradient are calculated by GPC, solution viscosity measurements are made to determine the It.V. of the pellets and preforms. The following equations describe such solution viscosity measurements and subsequent calculations:

$$\eta_{inh} = [\ln(t_s/t_o)]/C$$

where $\eta_{inh}$=Inherent viscosity at 25° C. at a polymer concentration of 0.50 g/100 mL of 60% phenol and 40% 1,1,2,2-tetrachloroethane
ln=Natural logarithm
$t_s$=Sample flow time through a capillary tube
$t_o$=Solvent-blank flow time through a capillary tube
C=Concentration of polymer in grams per 100 mL of solvent (0.50%)

The intrinsic viscosity is the limiting value at infinite dilution of the specific viscosity of a polymer. It is defined by the following equation:

$$\eta_{int} = \lim_{C \to 0}(\eta_{sp}/C) = \lim_{C \to 0} \ln(\eta_r/C)$$

where $\eta_{int}$=Intrinsic viscosity
$\eta_r$=Relative viscosity=$t_s/t_o$
$\eta_{sp}$=Specific viscosity=$\eta_r - 1$ Instrument calibration involves replicate testing of a standard reference material and then applying appropriate mathematical equations to produce the "accepted" I.V. values.

Calibration Factor=Accepted IV of Reference Material/Average of Replicate Determinations Corrected IhV=Calculated IhV×Calibration Factor The intrinsic viscosity (ItV or $\eta_{int}$) may be estimated using the Billmeyer equation as follows:

$$\eta_{int} = [e^{0.5 \times Corrected\ IhV} - 1] + (0.75 \times Corrected\ IhV)$$

There is now provided a polyester polymer particle having an It.V. of at least 0.75 dL/g, a surface, and a center, wherein the It.V. at the surface of the particle is not greater than 0.25 dL/g higher than the It.V. at the center of the particle, preferably not greater than 0.20 dL/g higher than the It.V. at the center of the particle. There is also provided a polyester polymer particle having an It.V. of at least 0.75 dL/g, a surface, and a center, wherein the It.V. of the particle at the surface is greater than the It.V. of the particle at its center by not more than 0.25 dL/g, preferably by no more than 0.20 dL/g.

The polyester particles are solid at 25° C. and 1 atmosphere. The shape of the particles is not limited. Suitable shapes include spheres, cubes, pellets, chips, pastilles, stars, and so forth. The particles have a number average weight of at least 0.10 g per 100 particles, more preferably greater than 1.0 g per 100 particles, and up to about 100 g per 100 particles. The volume of the particles is not particularly limited, but in one embodiment, there is provided a bulk of particles having a volume of at least 1 cubic meter, or at least 3 cubic meters. For example, one or more random samplings of 10 or more particles in a bulk of at least 1 cubic meter will yield the small surface to center It.V. gradient of the invention. Therefore, in a further embodiment, the average It.V. gradient in a bulk of particles having a volume of 1 cubic meter or more is small as set forth in this description.

The It.V. of the polyester particles is suitable for container applications. The It.V. of the polyester particles is at least 0.70 dL/g. For example, the It.V. of the polyester particles can be at least 0.75, or 0.77, or 0.80 dL/g, and up to about 1.2 dL/g, or 1.1 dL/g. The polyester particles fed to an injection molding machine are desirably not subjected to an increase in their molecular weight in the solid state.

The polyester particles have a small surface to center molecular weight gradient between the surface and the center of the particles than found in solid-stated polyester particles.

Without being bound to a theory, it is believed that when there is a significant difference in It.V. between the center and surface of the polyester particle, as in the case of a solid-stated polyester particle, and such a polymer is melted, the polymer chains undergo chemical reactions that equilibrate the molecular weight distribution. Even when the number-average molecular weight is unaffected, the equilibration causes the It.V. and weight-average molecular weight to decrease, which also causes a degradation of the physical properties of the polyester. Accordingly, by melt processing a polyester particle having a smaller surface to center molecular weight gradient, the loss in It.V. is reduced.

The polyester polymer particles have a surface and a center, and the It.V. at the surface of the particle is less than 0.25 dL/g higher than the It.V. at the center of the particle, preferably less than 0.20 dL/g higher than the It.V. at the center of the particle, preferably 0.15 dL/g or less, or 0.10 dL/g or less, or even 0.050 dL/g or less. In this embodiment, the It.V. of the polyester polymer at the surface of the particle can be much lower than the It.V. at the center of the particle. In another embodiment, however, there is provided a polyester particle which has a small surface to center It.V. gradient in that the absolute value of the difference in the It.V. between the center of the pellet and the surface of the pellet is less than 0.25 dL/g such that the surface It.V. can neither drop below nor exceed 0.20 dL/g relative to the center of the particle, preferably 0.15 dL/g or less, or 0.10 dL/g or less, or even 0.05 dL/g or less. In another embodiment, in a bulk of pellets having a volume of 1 cubic meter or more, the It.V. average of the differences between the It.V. of the surface of the particles and the It.V. of the center of the particles in the bulk is not greater than 0.25 dL/g, or 0.20 dL/g, or 0.15 dL/g, or 0.10 dL/g or 0.05 dL/g.

The surface of the pellet is defined as the outer 8 to 12% by mass, while the center is the inner 8 to 16% by mass around the particle center point. While the center point of an irregular shaped particle may be difficult to precisely determine, it is the best approximation of the intersection between most of the straight lines that can be drawn through the particle between the edges or corners having the longest distance from each other. To measure the It.V. of the surface and the center, a random sampling of 10 pellets from a batch is gradually dissolved according to the procedure set forth in the Examples, the weighted average of all measured cuts within the first 8-12 mass % dissolved being the surface of the pellet is recorded as It.V. surface, and the weighted average of all measured cuts within the last 8-16 mass % being the center is recorded as the It.V. center, and gradient being the difference between It.V. surface less the It.V. center. The number of measurements taken within each range is not limited, and can be as few as one measurement. The GPC method described above is used to separately measure the It.V. of each portion dissolved. In this way, a gradient starting from the surface of the particle all the way through to the center of the particle may be measured, taking only a surface and a center cut or as many cuts throughout the particle as one desires. Alternately, the particle is sliced with a microtome, a piece of the surface is cut away, a piece of the center is cut away, and they are then separately measured by the GPC method described above.

Because the polyester particles having a small surface to center molecular weight gradient undergo less It.V. loss during melt processing than conventional polyesters, one or more advantages are envisioned. The subject polyester can have a lower It.V. than conventional products to obtain the same It.V. and physical properties in a molded part; therefore, manufacturing costs for the polyester are reduced. The lower It.V. polyester may also reduce the viscosity of the polymer during the early stages of melt processing; hence, lower temperatures would be required and/or energy costs would be reduced. As a result of the lower melt processing temperatures, the acetaldehyde level in the preforms would be lower, and the time required to cool the polymer following melt processing would decrease as would the overall injection molding cycle time. Alternately, less drying is necessary to give the same It.V. loss as conventional polyesters; therefore, drying operational and capital costs are reduced.

The polymer can be produced by melt phase polymerization to a molecular weight suitable for container applications having an It.V. of at least 0.70 dL/g followed by process steps comprising in no particular order: formation of particles such as pellets, crystallization, and preferably removal of most of the residual acetaldehyde. It is preferred to feed the extruder for making sheet or preforms with polyester particles which have not been subjected to an increase in their molecular weight in the solid state since typical solid-state polymerization processes impart an undesirably large difference in It.V. between the center of the particle and the surface of the particle. However, if the polyester has been solid state polymerized, a small surface to center molecular weight gradient may be obtained by melting the solid stated polyester particles and then re-forming the molten polyester into solid particles that do not have a surface It.V. that exceeds 0.03 dL/g higher than the It.V. at its center.

Thus, in another embodiment, there is provided a polyester particle having an It.V. of at least 0.70 dL/g obtained by melt phase polymerization and without solid state polymerization, wherein the particle has an It.V., a surface, and a center, wherein the It.V. at the surface of the particle is less than 0.25 dL/g higher than the It.V. at the center of the particle, preferably less than 0.2 dL/g higher than the It.V. at the center of the particle, and in yet another embodiment, said particle has an It.V. at the surface which does not vary from the It.V. of the particle at its center by more than 0.25 dL/g.

There is also provided a process for making a polyester container, preferably a preform or beverage bottle, comprising feeding crystallized polyester particles having an It.V. of at least 0.70 dL/g, to an extrusion zone, melting the particles in the extrusion zone to form a molten polyester polymer composition, and forming a sheet or a molded part from extruded molten polyester polymer, wherein the polyester particles have an It.V., a surface, and a center, (and at least a portion of the polyester particles, preferably all the particles, have an It.V. at their surface which does not vary from their It.V. at their center by more than 0.25 dL/g, preferably by no more than 0.20 dL/g. The particles fed to the extrusion zone are preferably dried. The particles desirably have sufficient crystallinity to prevent them from sticking to each other and/or equipment during drying at a temperature ranging from 140° C. to 180° C. Moreover, the crystallized polyester particles fed to the extrusion zone after drying preferably contain low levels of acetaldehyde (as measured by the French National Standard Test), such as 10 ppm or less, or 5 ppm or less, or even 2 ppm or less. The sheet or molded part can be further processed to make thermoformed or blowmolded containers.

Typically, polyesters such as polyethylene terephthalate are made by reacting a diol such as ethylene glycol with a dicarboxylic acid as the free acid or its dimethyl ester to produce an ester monomer and/or oligomers, which are then polycondensed to produce the polyester. More than one compound containing carboxylic acid group(s) or derivative(s) thereof can be reacted during the process. All the compounds containing carboxylic acid group(s) or derivative(s) thereof that are in the product comprise the "carboxylic acid component." The mole % of all the compounds containing carboxylic acid group(s) or derivative(s) thereof that are in the product add up to 100. The "residues" of compound(s) containing carboxylic acid group(s) or derivative(s) thereof that are in the product refers to the portion of said compound(s) which remains in the oligomer and/or polymer chain after the condensation reaction with a compound(s) containing hydroxyl group(s). The residues of the carboxylic acid component refers to the portion of the said component which remains in the oligomer and/or polymer chain after the said component is condensed with a compound containing hydroxyl group(s).

More than one compound containing hydroxyl group(s) or derivatives thereof can become part of the polyester polymer product(s). All the compounds containing hydroxyl group(s) or derivatives thereof that become part of said product(s) comprise the hydroxyl component. The mole % of all the compounds containing hydroxyl group(s) or derivatives thereof that become part of said product(s) add up to 100. The residues of compound(s) containing hydroxyl group(s) or derivatives thereof that become part of said product refers to the portion of said compound(s) which remains in said product after said compound(s) is condensed with a compound(s) containing carboxylic acid group(s) or derivative(s) thereof and further polycondensed with polyester polymer chains of varying length. The residues of the hydroxyl component refers to the portion of the said component which remains in said product.

The mole % of the hydroxyl residues and carboxylic acid residues in the product(s) can be determined by proton NMR.

The polyester polymers of the invention comprise:
(a) a carboxylic acid component comprising at least 90 mole % of the residues of terephthalic acid, derivates of terephthalic acid, naphthalene-2,6-dicarboxylic acid, derivatives of naphthalene-2,6-dicarboxylic acid, or mixtures thereof, and
(b) a hydroxyl component comprising at least 90 mole % of the residues of ethylene glycol, based on 100 mole percent of carboxylic acid component residues and 100 mole percent of hydroxyl component residues in the polyester polymer.

In another embodiment, the polyester polymer comprises:
(a) a carboxylic acid component comprising at least 92 mole %, or at least 96 mole %, of the residues of terephthalic acid, derivates of terephthalic acid, naphthalene-2,6-dicarboxylic acid, derivatives of naphthalene-2,6-dicarboxylic acid, or mixtures thereof, and
(b) a hydroxyl component comprising at least 92 mole %, or at least 96 mole %, of the residues of ethylene glycol, based on 100 mole percent of the carboxylic acid component residues and 100 mole percent of the hydroxyl component residues in the polyester polymer.

The reaction of the carboxylic acid component with the hydroxyl component during the preparation of the polyester polymer is not restricted to the stated mole percentages since one may utilize a large excess of the hydroxyl component if desired, e.g. on the order of up to 200 mole % relative to the 100 mole % of carboxylic acid component used. The polyester polymer made by the reaction will, however, contain the stated amounts of aromatic dicarboxylic acid residues and ethylene glycol residues.

Derivates of terephthalic acid and naphthalane dicarboxylic acid include $C_1$-$C_4$ dialkylterephthalates and $C_1$-$C_4$ dialkylnaphthalates, such as dimethylterephthalate and dimethyinaphthalate In addition to a diacid component of terephthalic acid, derivates of terephthalic acid, naphthalene-2,6-dicarboxylic acid, derivatives of naphthalene-2,6-dicarboxylic acid, or mixtures thereof, the carboxylic acid component(s) of the present polyester may include one or more additional modifier carboxylic acid compounds. Such additional modifier carboxylic acid compounds include mono-carboxylic acid compounds, dicarboxylic acid compounds, and compounds with a higher number of carboxylic acid groups . Examples include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. More specific examples of modifier dicarboxylic acids useful as an acid component(s) are phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexanedicarboxylic acid being most preferable. It should be understood that use of the corresponding acid anhydrides, esters, and acid chlorides of these acids is included in the term "carboxylic acid". It is also possible for tricarboxyl compounds and compounds with a higher number of carboxylic acid groups to modify the polyester.

In addition to a hydroxyl component comprising ethylene glycol, the hydroxyl component of the present polyester may include additional modifier mono-ols, diols, or compounds with a higher number of hydroxyl groups. Examples of modifier hydroxyl compounds include cycloaliphatic diols preferably having 6 to 20 carbon atoms and/or aliphatic diols preferably having 3 to 20 carbon atoms. More specific examples of such diols include diethylene glycol; triethylene glycol; 1,4-cyclohexanedimethanol; propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2,5-ethylhexanediol-(1,3); 2,2-diethyl propane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane.

The polyester pellet compositions may include blends of polyalkylene terephthalates and polyalkylene naphthalates along with other thermoplastic polymers such as polycarbonate (PC) and polyamides. It is preferred that the polyester composition should comprise a majority of the polyester polymers, more preferably in an amount of at least 80 wt. %, or at least 95 wt. %, and most preferably 100 wt. %, based on the weight of all thermoplastic polymers (excluding fillers, inorganic compounds or particles, fibers, impact modifiers, or other polymers which may form a discontinuous phase). It is also preferred that the polyester polymers do not contain any fillers, fibers, or impact modifiers or other polymers which form a discontinuous phase.

The polyester compositions can be prepared by polymerization procedures known in the art sufficient to effect esterification and polycondensation. Polyester melt phase manufacturing processes include direct condensation of a dicarboxylic acid with the diol, optionally in the presence of esterification catalysts, in the esterification zone, followed by polycondensation in the prepolymer and finishing zones in the presence of a polycondensation catalyst; or ester exchange usually in the presence of a transesterification catalyst in the ester exchange zone, followed by prepolymerization and finishing in the presence of a polycondensation catalyst, and each may optionally be solid stated according to known methods.

To further illustrate, a mixture of one or more dicarboxylic acids, preferably aromatic dicarboxylic acids, or ester forming derivatives thereof, and one or more diols are continuously fed to an esterification reactor operated at a temperature of between about 200° C. and 300° C., typically between 240° C. and 290° C., and at a pressure of between about 1 psig up to about 70 psig. The residence time of the reactants typically ranges from between about one and five hours. Normally, the dicarboxylic acid(s) is directly esterified with diol(s) at elevated pressure and at a temperature of about 240° C. to about 270° C. The esterification reaction is continued until a degree of esterification of at least 60% is achieved, but more typically until a degree of esterification of at least 85% is achieved to make the desired monomer and/or oligomers. The monomer and/or oligomer forming reaction(s) are typically uncatalyzed in the direct esterification process and catalyzed in ester exchange processes.

Polycondensation catalysts may optionally be added in the esterification zone along with esterification/ester exchange catalysts. If a polycondensation catalyst was added to the esterification zone, it is typically blended with the diol and fed into the esterification reactor. Typical ester exchange catalysts, which may be used separately or in combination, include titanium alkoxides, tin (II) or (IV) esters, zinc, manganese, or magnesium acetates or benzoates and/or other such catalyst materials that are well known to those skilled in the art. Phosphorus containing compounds and some colorants may also be present in the esterification zone.

The resulting products formed in the esterification zone include bis(2-hydroxyethyl) terephthalate (BHET) monomer, low molecular weight oligomers, DEG, and water (or alcohol in the case of ester exchange) as the condensation by-product, along with other trace impurities formed by the reaction of the catalyst, if any, or starting materials and other compounds such as colorants, impurities in the starting materials or the phosphorus containing compounds. The relative amounts of BHET and oligomeric species will vary depending on whether the process is a direct esterification process in which case the amount of oligomeric species are significant and even present as the major species, or a ester exchange process in which case the relative quantity of BHET predominates over the oligomeric species. The water (or alcohol) is removed as the esterification reaction (or ester exchange) proceeds to drive the equilibrium toward products. The esterification zone typically produces the monomer and oligomer mixture, if any, continuously in a series of one or more reactors. Alternately, the monomer and oligomer mixture could be produced in one or more batch reactors. It is understood, however, that in a process for making PEN, the reaction mixture will contain monomeric species of bis(2-hydroxyethyl) naphthalate and its corresponding oligomers.

Once the ester monomer/oligomer is made to the desired degree of esterification, it is transported from the esterification reactors in the esterification zone to the polycondensation zone comprised of a prepolymer zone and a finishing zone. Polycondensation reactions are initiated and continued in the melt phase in a prepolymerization zone and finished in the melt phase in a finishing zone, after which the melt is solidified into precursor solids in the form of chips, pellets, or any other shape.

Each zone may comprise a series of one or more distinct reaction vessels operating at different conditions, or the zones may be combined into one reaction vessel using one or more sub-stages operating at different conditions in a single reactor. That is, the prepolymer stage can involve the use of one or more reactors operated continuously, one or more batch reactors, or even one or more reaction steps or sub-stages performed in a single reactor vessel. In some reactor designs, the prepolymerization zone represents the first half of polycondensation in terms of reaction time, while the finishing zone represents the second half of polycondensation. While other reactor designs may adjust the residence time between the prepolymerization zone to the finishing zone at about a 2:1 ratio, a common distinction in many designs between the prepolymerization zone and the finishing zone is that the latter zone frequently operates at a higher temperature and/or lower pressure than the operating conditions in the prepolymerization zone. Generally, each of the prepolymerization and the finishing zones comprise one or a series of more than one reaction vessel, and the prepolymerization and finishing reactors are sequenced in a series as part of a continuous process for the manufacture of the polyester polymer.

In the prepolymerization zone, also known in the industry as the low polymerizer, the low molecular weight monomers and oligomers are polymerized via polycondensation to form polyethylene terephthalate polyester (or PEN polyester) in the presence of a catalyst. If the catalyst was not added in the monomer esterification stage, the catalyst is added at this stage to catalyze the reaction between the monomers and low molecular weight oligomers to form prepolymer and split off the diol as a by-product. Other compounds such as phosphorus-containing compounds, cobalt compounds, and colorants can also be added in the prepolymerization zone. These compounds may, however, be added in the finishing zone instead of or in addition to the prepolymerization zone and esterification zone. In a typical DMT-based process, those skilled in the art recognize that other catalyst material and points of adding the catalyst material and other ingredients vary from a typical direct esterification process.

Typical polycondensation catalysts include the compounds of Sb, Ti, Ge, and Sn in an amount ranging from 0.1 to 500 ppm based on the weight of resulting polyester polymer.

This prepolymer polycondensation stage generally employs a series of one or more vessels and is operated at a temperature of between about 250° C. and 305° C. for a period between about five minutes to four hours. During this stage, the It.V. of the monomers and oligomers is increased up to about no more than about 0.5 dL/g. The diol byproduct is removed from the prepolymer melt using an applied vacuum ranging from 4 to 70 torr to drive the reaction to completion. In this regard, the polymer melt is sometimes agitated to promote the escape of the diol from the polymer melt. As the polymer melt is fed into successive vessels, the molecular weight and thus the intrinsic viscosity of the polymer melt increases. The pressure of each vessel is generally decreased to allow for a greater degree of polymerization in each successive vessel or in each successive zone within a vessel. However, to facilitate removal of glycols, water, alcohols, aldehydes, and other reaction byproducts, the reactors are typically run under a vacuum or purged with an inert gas. Inert gas is any gas which does not cause unwanted reaction or product characteristics at reaction conditions. Suitable gases include, but are not limited to, argon, helium and nitrogen.

The prepolymer is fed from the prepolymer zone to a finishing zone where the second half of polycondensation is continued in one or more finishing vessels generally, but not necessarily, ramped up to higher temperatures than present in the prepolymerization zone, to a value within a range of from 270° C. to 305° C. until the It.V. of the melt is increased from the It.V of the melt in the prepolymerization zone (typically 0.30 but usually not more than 0.5) to an It.V. of at least 0.55. The It.V. of polyester compositions ranges from about 0.55 to about 1.15 dL/g. Preferably, the It.V. of the polyester particles ranges from 0.70 dL/g to 1.15 dL/g without solid state polymerization. The final vessel, generally known in the industry as the "high polymerizer," "finisher," or "polycondenser," is operated at a pressure lower than used in the prepolymerization zone, e.g. within a range of between about 0.2 and 4.0 torr. Although the finishing zone typically involves the same basic chemistry as the prepolymer zone, the fact that the size of the molecules, and thus the viscosity differs, means that the reaction conditions and vessel(s) may also differ. However, like the prepolymer reactor, each of the finishing vessel(s) is operated under vacuum or inert gas, and each is typically agitated to facilitate the removal of ethylene glycol, although the form of the agitation is suitable for higher viscosities.

Additives can be added to the melt phase or to the polyester polymer to enhance the performance properties of the polyester polymer. For example, crystallization aids, impact modifiers, surface lubricants, denesting agents, stabilizers, antioxidants, ultraviolet light absorbing agents, metal deactivators, colorants, nucleating agents, acetaldehyde lowering compounds, reheat rate enhancing aids such as elemental antimony or reduced antimony or reducing agents to form such species in situ, silicon carbide, carbon black, graphite, activated carbon, black iron oxide, red iron oxide and the like, sticky bottle additives such as talc, and fillers and the like can be included. The resin may also contain small amounts of branching agents such as trifunctional or tetrafunctional carboxylic acids or their derivatives and/or alcohols such as trimellitic anhydride, trimethylol propane, pyromellitic dianhydride, pentaerythritol, and other polyester forming polyacids or polyols generally known in the art. All of these additives and many others and their use are well known in the art and do not require extensive discussion. Any of these compounds can be used in the present composition.

The molten polymer from the melt phase polymerization may be allowed to solidify from the melt without further crystallization. Alternatively, the molten polymer can be first solidified and then crystallized from the glass.

Instead of making the polyester particle directly from the melt phase polymerization process, the particle may be made by melting post consumer recycled polyester polymer. However, since the molecular weight of bulk recycled polyester polymers can vary widely depending on their source or their service requirement, it is preferred that the polyester particle composition comprises at least 75 wt % virgin polyester polymer. A virgin polyester polymer is made without post consumer recycled polymers, but it may optionally contain scrap or regrind polymer.

The method for solidifying the polyester polymer from the melt phase process is not limited. For example, molten polyester polymer from the melt phase may be directed through a die, or merely cut, or both directed through a die followed by cutting the molten polymer. A gear pump may be used as the motive force to drive the molten polyester polymer through the die. Instead of using a gear pump, the molten polyester polymer may be fed into a single or twin screw extruder and extruded through a die, optionally at a temperature of 190° C. or more at the extruder nozzle. Once through the die, the polyester polymer can be drawn into strands, contacted with a cool fluid, and cut into pellets, or the polymer can be pelletized at the die head, optionally underwater. The polyester polymer melt is optionally filtered to remove particulates over a designated size before being cut. Any conventional hot pelletization or dicing method and apparatus can be used, including but not limited to dicing, strand pelletizing and strand (forced conveyance) pelletizing, pastillators, water ring pelletizers, hot face pelletizers, underwater pelletizers and centrifuged pelletizers.

The method and apparatus used to crystallize the polyester polymer is not limited, and includes thermal crystallization in a gas or liquid. The crystallization may occur in a mechanically agitated vessel; a fluidized bed; a bed agitated by fluid movement; an un-agitated vessel or pipe; crystallized in a liquid medium above the $T_g$ of the polyester polymer, preferably at 140° C. to 180° C.; or any other means known in the art. Also, the polymer may be strain crystallized.

It is desirable to crystallize the pellets to at least a 15% degree of crystallization, more preferably to at least 25%, or at least 30%, or at least 35%, or at least 40%.

Pellet crystallinity is determined using Differential Scanning Calorimetry (DSC). The sample weight for this measurement is 10±1 mg and the sample consists of either (1) a portion of a single pellet, or more preferably (2) a sample taken from several grams of cryogenically ground pellets. The first heating scan is performed. The sample is heated from approximately 25° C. to 290° C. at a rate of 20° C./minute, and the absolute value of the area of the melting endotherms (one or more) minus the area of any crystallization exotherms is determined. This area corresponds to the net heat of melting and is expressed in Joules. The heat of melting of 100% crystalline PET is taken to be 119 Joules/gram, so the weight fraction crystallinity of the pellet is calculated as the net heat of melting divided by 119. Unless otherwise stated, the initial melting point in each case is also determined using the same DSC scan.

The percent crystallinity is calculated from both of:
Low peak melting point: $T_{m1a}$
High peak melting point: $T_{m1b}$ Note that in some cases, particularly at low crystallinity, rearrangement of crystals can occur so rapidly in the DSC instrument that the true, lower melting point is not detected. The lower melting point can then be seen by increasing the temperature ramp rate of the DSC instrument and using smaller samples. A Perkin-Elmer Pyris-1 calorimeter is used for high-speed calorimetry. The specimen mass is adjusted to be inversely proportional to the scan rate. About a 1 mg sample is used at 500° C./min and about 5 mg are used at 100° C./min. Typical DSC sample pans were used. Baseline subtraction is performed to minimize the curvature in the baseline.

Alternatively, percent crystallinity is also calculated from the average gradient tube density of two to three pellets. Gradient tube density testing is performed according to ASTM D 1505, using lithium bromide in water.

Once the pellets are crystallized to the desired degree, they are transported to a machine for melt processing into the desired shape, such as sheets for thermoforming into trays or preforms suitable for stretch blow molding into beverage or food containers. Examples of beverage containers include containers having a volume of 3 liters or less, suitable for hot fill, carbonated soft drinks, or water.

Thus, there is also provided the process for making a container such as a tray or a bottle preform suitable for stretch blow molding comprising drying PET pellets having an It.V. ranging from 0.7 to 1.15 dL/g and a small surface to center molecular weight gradient in a drying zone at a zone temperature of at least 140° C., introducing the dried pellets into an extrusion zone to form a molten PET polymer composition, and forming a sheet or a molded part from extruded molten PET polymer.

In this embodiment, the pellets which are prepared for introduction into an extruder are preferably not solid stated, or if solid stated have been re-melted and solidified to yield a desired small surface to center molecular weight gradient. These polyester particles have an It.V. sufficiently high such that the physical properties are suitable for the manufacture of bottle preforms and trays. The non-solid stated high It.V. pellets have been sufficiently crystallized to prevent them from significantly agglomerating in the dryer at temperatures of 140° C. or more, and up to about 190° C., or 180° C. Dryers feeding melt extruders are needed to reduce the moisture content of pellets. Moisture in or on pellets fed into a melt extrusion chamber will cause the melt to lose It.V. at melt temperatures by hydrolyzing the ester linkages with a resulting change in the melt flow characteristics of the polymer and stretch ratio of the preform when blown into bottles. Therefore, prior to extrusion the pellets are dried at a temperature of 140° C. or more to drive off most all of the moisture on and in the pellet, meaning that the temperature of the heating medium (such as a flow of nitrogen gas or air) is 140° C. or more. It is desirable to dry the pellets at high temperatures of 140° C. or more to decrease the residence time of the pellets in the dryer and increase throughput.

To dry at high temperatures while minimizing agglomeration in a conventional dryer equipped with or without an agitator, the pellets should be crystallized at 140° C. or more. In general, the typical residence time of pellets in the dryer at conventional temperatures (140° C. to 190° C.) will on average be from 0.75 hours to 8 hours. Any conventional dryer can be used. The pellets may be contacted with a flow of heated air or inert gas such as nitrogen to raise the temperature of the pellets and remove volatiles from inside the pellets, and may also be agitated by a rotary mixing blade or paddle. The flow rate of the heating gas, if used, is a balance between energy consumption, residence time of pellets, and preferably avoiding the fluidization of the pellets. Suitable gas flow rates range from 0.05 to 100 scfm for every pound per hour of pellets discharged from the dryer, preferably from 0.2 to 5 scfm per lb/hr of pellets.

Once the pellets have been dried, they are introduced into an extrusion zone to form molten polyester polymer, followed by processing the molten polymer to form a molded part, such as a bottle preform (parison) through injecting the melt into a mold or extruding into a sheet or coating. Methods for the introduction of the dried pellets into an extrusion zone, for melt processing, injection molding, and sheet extrusion are conventional and known to those of skill in the manufacture of such containers. Extruder barrel temperatures ranging from 260° C. to 305° C. are suitable for processing the polyester particles of the invention.

At the extruder, or in the melt phase for making the polyester polymer, other components can be added to the composition of the present invention to enhance the performance properties of the polyester polymer. These components may be added neat to the bulk polyester, may added as a dispersion in a liquid carrier or may be added to the bulk polyester as a polyester concentrate containing at least about 0.5 wt. % of the component in the polyester let down into the bulk polyester.

The types of suitable components include crystallization aids, impact modifiers, surface lubricants, stabilizers, denesting agents, antioxidants, ultraviolet light absorbing agents, metal deactivators, colorants, nucleating agents, acetaldehyde lowering compounds, reheat rate enhancing aids, sticky bottle additives such as talc, and fillers and the like can be included. The resin may also contain small amounts of branching agents such as trifunctional or tetrafunctional comonomers such as trimellitic anhydride, trimethylol propane, pyromellitic dianhydride, pentaerythritol, and other polyester forming polyacids or polyols generally known in the art. All of these additives and many others and their use are well known in the art and do not require extensive discussion. Any of these compounds can be used in the present composition.

Not only may containers be made from pellets made according to the process of this invention, but other items such as sheet, film, bottles, trays, other packaging, rods, tubes, lids, filaments and fibers, and other injection molded articles may also be manufactured using the polyester particles of the invention. Beverage bottles made from polyethylene terephthalate suitable for holding water or carbonated beverages, and heat set beverage bottle suitable for holding beverages which are hot filled into the bottle are examples of the types of bottles which are made from the crystallized pellet of the invention.

The invention may now be further understood by reference to the following non-limiting illustrative examples.

EXAMPLES

The method for determining the molecular weight gradient throughout the pellets was as follows. 10 pellets having a combined mass of 0.20±0.06 gram were placed in a small stainless steel wire mesh basket. The basket was placed into a small flask containing 3 to 4 mL of stirred GPC solvent (70% hexafluoroisopropanol, 30% methylene chloride) such that the pellets were immersed in the solvent. After a period of time appropriate for the dissolution rate of the pellets (about 2 minutes for the pellets of Examples 2 and 4 and 10 minutes for the pellets of Comparative Examples 1 and 3) the basket was removed from the flask. This caused the outer layer of the pellets to become dissolved in the GPC solvent. The procedure was sequentially repeated using fresh solvent for each cycle until the pellets were completely dissolved. The solution from each dissolution cycle ("cut") was diluted with additional GPC solvent to increase the volume to 10.0 mL. The molecular weight distribution of each "cut" was measured by injecting 10 µL into the GPC. The It.V. was calculated from the $<M>_w$ using the relations given above. The mass of polymer present in each "cut" was calculated as the chromatogram peak area for that "cut" divided by the total chromatogram peak area for all of the "cuts" of that sample.

Other than the It.V. values reported for determining the molecular weight gradient, reported It.V. values are determined by the solution viscosity method.

Comparative Example 1

Conventional solid stated pellets commercially available from Eastman Chemical Company as PET CB11 E were dried in a commercial-scale desiccant-air dryer. The temperature in the primary dryer hopper (5.5 hour pellet residence time) was 175° C. and the temperature in the secondary dryer hopper (2 hours residence time) was 185° C. The pellets had a degree of crystallinity of about 47% by weight as measured by DSC. The It.V. of the dried pellets was 0.803 dL/g. The It.V. difference between the center and surface (the pellet It.V. gradient) was measured according to the procedures described above and the results are given in Table 1.

TABLE 1

It.V. Gradient for the Pellets of Comparative Example 1

| Cut | Cumulative Weight Fraction Dissolved | $<M>_w$ | It.V. Calculated from $<M>_w$ |
| --- | --- | --- | --- |
| 1 (surface) | 0.090 | 71794 | 0.976 |
| 2 | 0.168 | 62511 | 0.881 |
| 3 | 0.245 | 58167 | 0.836 |
| 4 | 0.318 | 55094 | 0.803 |
| 5 | 0.394 | 52909 | 0.780 |
| 6 | 0.475 | 50790 | 0.757 |

TABLE 1-continued

It.V. Gradient for the Pellets of Comparative Example 1

| Cut | Cumulative Weight Fraction Dissolved | $<M>_w$ | It.V. Calculated from $<M>_w$ |
|---|---|---|---|
| 7 | 0.522 | 50210 | 0.750 |
| 8 | 0.575 | 49440 | 0.742 |
| 9 | 0.620 | 48601 | 0.733 |
| 10 | 0.683 | 47826 | 0.725 |
| 11 | 0.719 | 47403 | 0.720 |
| 12 | 0.820 | 46720 | 0.712 |
| 13 | 0.847 | 46314 | 0.708 |
| 14 (center) | 1.000 | 44861 | 0.692 |

The results show that the It.V. of the surface cut (Cut 1, outer 9.0% by weight of the pellets) was 0.976 and that the It.V. of the center cut (Cut 14, center 15.3% by weight of the pellets) was about 0.692. This corresponds to an It.V. difference of 0.284 between the surface and center of the pellets.

The dried pellets were melt processed into preforms using a commercial-scaling injection molding machine for making the preforms. The temperature of the molding machine extruder barrel zones ranged from 275° C. to 295° C. The It.V. of the preforms was 0.759 dL/g. Melt processing caused the It.V. to be reduced by 0.044 dL/g.

Example 2

Polyester pellets having a similar chemical composition to the pellets of Comparative Example 1 had an It.V. of 0.831 dL/g (solution viscosity) after drying under the same conditions as described in Comparative Example 1. The pellets had a degree of crystallinity of about 36.5% by weight as measured by DSC and were not solid stated. The It.V. gradient between the center and surface was measured according to the procedures described above. Table 2 sets forth the results of the measurements.

TABLE 2

It.V. Gradient for the Pellets of Example 2

| Cut | Cumulative Weight Fraction Dissolved | $<M>_w$ | It.V. Calculated from $<M>_w$ |
|---|---|---|---|
| 1 (surface) | 0.102 | 57351 | 0.827 |
| 2 | 0.300 | 57576 | 0.829 |
| 3 | 0.444 | 58347 | 0.838 |
| 4 | 0.595 | 57871 | 0.832 |
| 5 | 0.691 | 58300 | 0.837 |
| 6 | 0.791 | 57608 | 0.830 |
| 7 | 0.850 | 59243 | 0.847 |
| 8 | 0.901 | 59208 | 0.847 |
| 9 | 0.936 | 58596 | 0.840 |
| 10 | 0.970 | 59493 | 0.849 |
| 11 (center) | 1.000 | 59128 | 0.846 |

The results show that the It.V. of the surface cut (Cut 1, outer 10.2% by weight of the pellets) was 0.827 and that the It.V. of the center cuts (Cuts 8-11, center 15.0% by weight of the pellets) was about 0.847. This corresponds to an It.V. difference of 0.020 between the surface and center of the pellets.

The dried pellets were melt processed into preforms using the same conditions as described in Comparative Example 1. The It.V. of the preforms was 0.812 dL/g. Melt processing caused the It.V. to be reduced by 0.019 dL/g, less than 50% of the It.V. reduction experienced by the conventional pellets of Comparative Example 1.

Comparative Example 3

Conventional solid-state polymerized pellets commercially available from Eastman Chemical Company as Voridian CB12 solid stated to an It.V. (before drying) of 0.850 were dried in a small dryer (approximately 40 pounds capacity) at 150° C. for 6 hours. The pellets had a degree of crystallinity of about 48% by weight as measured by DSC. The It.V. difference between the center and surface (the pellet It.V. gradient) was measured according to the procedures described above and the results are given in Table 3.

TABLE 3

It.V. Gradient for the Pellets of Comparative Example 3

| Cut | Cumulative Weight Fraction Dissolved | $<M>_w$ | It.V. Calculated from $<M>_w$ |
|---|---|---|---|
| 1 (surface) | 0.083 | 80992 | 1.067 |
| 2 | 0.143 | 73439 | 0.992 |
| 3 | 0.212 | 67237 | 0.930 |
| 4 | 0.340 | 61829 | 0.874 |
| 5 | 0.467 | 57023 | 0.823 |
| 6 | 0.608 | 54777 | 0.800 |
| 7 | 0.737 | 51950 | 0.769 |
| 8 | 0.862 | 50299 | 0.751 |
| 9 | 0.904 | 50609 | 0.754 |
| 10 | 0.952 | 49795 | 0.746 |
| 11 | 0.977 | 49063 | 0.738 |
| 12 (center) | 1.000 | 48459 | 0.731 |

The results show that the It.V. of the surface cut (Cut 1, outer 8.3% by weight of the pellets) was 1.067 and that the It.V. of the center cuts (Cuts 9-12, center 13.8% by weight of the pellets) was about 0.744. This corresponds to an It.V. difference of 0.323 between the surface and center of the pellets.

The dried pellets were melt processed into preforms using a laboratory-scale injection molding machine. The temperature of the molding machine extruder barrel was 285° C. The It.V. of the preforms was 0.801 dL/g. Melt processing caused the It.V. to be reduced by 0.049 dL/g.

Example 4

Polyester pellets from the same batch as those used in Example 2 were dried and melt processed into preforms using the same conditions as described in Comparative Example 3. These pellets had an It.V. (before drying) of 0.830 and less difference (<0.2 dL/g) between the It.V. of the center and surface of the pellet. The It.V. of the preforms was 0.810 dL/g. Melt processing caused the It.V. to be reduced by 0.020 dL/g, less than 50% of the It.V. reduction experienced by the conventional pellets of Comparative Example 3.

What we claim is:

1. A process for making a container from a polyester(s) polymer, comprising feeding polyester particles having a degree of crystallinity of at least 15% and an It.V. of at least 0.70 dL/g to an extrusion zone, melting the particles in the extrusion zone to form a molten polyester polymer composition, and forming a sheet or a molded part from extruded molten polyester polymer, wherein the absolute value of the difference in the It.V. between the center and the surface of the polyester particles fed to the extrusion zone is less than 0.25 dL/g, the polyester particles are not solid state polymerized before introducing said particles into the extrusion zone, and the polyester particles have an acetaldehyde level of 10 ppm or less before introducing said particles into the extrusion zone.

2. The process of claim 1, wherein the absolute difference is less than 0.20 dL/g.

3. The process of claim 2, wherein the absolute difference is 0.10 dL/g or less.

4. The process of claim 3, wherein the absolute difference is 0.05 dL/g or less.

5. The process of claim 1, wherein the absolute difference is less than 0.15 dL/g.

6. The process of claim 1, wherein the absolute difference between the It.V. of the particles at their surface and at their center is 0.05 dL/g or less.

7. The process of claim 6, wherein the polyester particles introduced into the extrusion zone have a degree of crystallinity of at least 35 percent.

8. The process of claim 1, wherein the degree of crystallinity is at least 25%.

9. The process of claim 1, wherein the degree of crystallinity is at least 35%.

10. The process of claim 1, wherein the degree of crystallinity is at least 40%.

11. The process of claim 1, wherein the particles have an It.V. of at least 0.80 dL/g.

12. The process of claim 1, wherein the particles have an acetaldehyde level of 5 ppm or less before introducing said particles into the extrusion zone.

13. The process of claim 12, wherein the degree of crystallinity is at least 40%.

14. The process of claim 13, wherein the absolute difference is less than 0.05 dL/g.

15. The process of claim 1, wherein the particles have an acetaldehyde level of 2 ppm or less before introducing said particles into the extrusion zone.

16. The process of claim 1, wherein the molded part is a container preform.

17. The process of claim 16, comprising stretch blow molding the preform into a beverage container.

18. The process of claim 17, wherein the container has a volume of 3 liters or less.

19. The process of claim 1, comprising drying the particles in a drying zone at temperature of at least 140° before melting the particles in the extrusion zone.

20. The process of claim 1, further comprising drying the particles before feeding the particles to the extrusion zone, wherein the particles are not solid state polymerized before drying.

21. The process of claim 1, comprising a bulk of said particles having a volume of at least 1 cubic meter.

22. The process of claim 1, wherein the particles are obtained from underwater pelletizers.

23. The process of claim 1, wherein said particles fed to the extrusion zone comprise spherical particles.

24. The process of claim 1, wherein the particles contain phosphorus.

25. The process of claim 1, wherein the particles are obtained by polycondensing in the presence of a catalyst comprising titanium.

26. The process of claim 1, wherein the particles are obtained by polycondensing in the presence of a catalyst consisting essentially of titanium.

27. The process of claim 1, wherein the particles are obtained by polycondensing in the presence of a catalyst comprising antimony.

28. The process of claim 1, wherein the particles are obtained by polycondensing in the presence of a catalyst consisting essentially of antimony.

29. The process of claim 1, wherein the particles contain a reheat rate enhancing aid.

30. The process of claim 1, wherein the reheat enhancing aid comprises elemental antimony, carbon black, graphite, or black iron oxide.

31. The process of claim 1, wherein the particles comprise strain crystallized polyester polymers.

32. The process of claim 1, wherein the particles are dried at a temperature of 140 °C. or more prior to feeding the particles into the extrusion zone.

33. The process of claim 3, wherein the particles are dried at a gas flow rate of 0.2 to 5 scfm per lb/hr.

34. The process of claim 1, wherein a metal deactivator is added to a melt phase for making the polyester polymer particles.

35. The process of claim 1, comprising injection molding the molten polyester polymer to form a container suitable for heat set beverage bottles.

36. The process of anyone of claims 23-35, wherein the particles are obtained from underwater pelletizers.

37. The process of anyone of claim 22 and 24-35, wherein the particles are spherical.

38. The process of anyone of claim 22-30 and 32-35, wherein the particles comprise strain crystallized polyester polymers.

39. The process of anyone of claims 22-23 and 25-35, wherein the particles contain phosphorus.

40. The process of anyone of claim 22-35, wherein the particles fed to the extrusion zone have an acetaldehyde level of 2 ppm or less.

41. The process of claim 1, wherein the polyester polymer particles comprise:

(a) a carboxylic acid component comprising at least 90 mole % of the residues of terephthalic acid, or derivates of terephthalic acid, or mixtures thereof, and (b) a hydroxyl component comprising at least 90 mole % of the residues of ethylene glycol, based on 100 mole percent of the carboxylic acid component residues and 100 mole percent hydroxyl component residues in the polyester polymer, and at least 75% of the polyester polymer is virgin polymer.

42. The process of claim 41, wherein the polyester polymer particles comprises:

(a) a carboxylic acid component comprising at least 92 mole % of the residues of terephthalic acid, or derivates of terephthalic acid, or mixtures thereof, and (b) a hydroxyl component comprising at least 92 mole % of the residues of ethylene glycol, based on 100 mole percent of the carboxylic acid component residues and 100 mole percent hydroxyl component residues in the polyester polymer.

43. The process of claim 41, wherein the molded part formed from the polyester polymer composition in the extrusion zone is a preform.

44. The process of claim 43, wherein the preform is stretch blow molded into a beverage container.

45. The process of claim 41, wherein polyester particles having a degree of crystallinity of at least 25 percent and an It.V. of at least 0.75 dL/g obtained without solid state polymerization, wherein the absolute value of the difference in the It.V. between the center and the surface of the polyester particles is 0.20 dL/g or less, and wherein the molded part is a bottle preform.

46. The process of claim 45, wherein the degree of crystallinity is at least 35 percent, the It.V. is at least 0.77 dL/g.

47. The process of claim 46, wherein the absolute difference between the It.V. of the polyester particles at their surface and at their center is 0.05 dL/g or less.

48. A process for making a container from a polyester(s) polymer, comprising feeding spherical polyester particles having a degree of crystallinity of at least 15% and an It.V. of at least 0.70 dL/g to an extrusion zone, melting the spherical particles in the extrusion zone to form a molten polyester polymer composition, and forming a sheet or a molded part from extruded molten polyester polymer, wherein the absolute value of the difference in the It.V. between the center and the surface of the spherical polyester particles fed to the extrusion zone is less than 0.25 dL/g, and the spherical polyester particles are not solid state polymerized before introducing said particles into the extrusion zone, and the spherical polyester polymer particles comprise:

(a) a carboxylic acid component comprising at least 92 mole % of the residues of terephthalic acid, or derivates of terephthalic acid, or mixtures thereof, and (b) a hydroxyl component comprising at least 92 mole % of the residues of ethylene glycol, based on 100 mole percent of the carboxylic acid component residues and 100 mole percent hydroxyl component residues in the polyester.

49. The process of claim 48, wherein the degree of crystallinity of the polyester particles is at least 40%.

50. The process of claim 48, wherein the absolute value of the difference in the It.V. between the center and the surface of the polyester particles fed to the extrusion zone is less than 0.05 dL/g.

51. The process of claim 48, wherein the particles are dried at a gas flow rate of 0.2 to 5 scfm per lb/hr.

52. The process of claim 48, wherein a metal deactivator is added to a melt phase for making the polyester polymer particles.

53. The process of claim 48, comprising injection molding the molten polyester polymer to form a container suitable for heat set beverage bottles.

54. The process of claim 48, wherein the particles are obtained from underwater pelletizers.

55. The process of claim 48, wherein the particles comprise strain crystallized polyester polymers.

56. The process of claim 48, wherein the particles have an acetaldehyde level of 2 ppm or less.

57. The process of claim 48, wherein the It.V. of the polyester particles fed to the extrusion zone is 0.80 dL/g or more.

* * * * *

UNITED STATES PATENT AND TRADEMARK OFFICE
CERTIFICATE OF CORRECTION

| | | |
|---|---|---|
| PATENT NO. | : 7,459,113 B2 | Page 1 of 1 |
| APPLICATION NO. | : 10/795783 | |
| DATED | : December 2, 2008 | |
| INVENTOR(S) | : Frederick Leslie Colhoun et al. | |

It is certified that error appears in the above-identified patent and that said Letters Patent is hereby corrected as shown below:

Column 4, Line 31. Please remove entire line:

$$\eta_{int} = [e^{0.5 \times \text{Corrected IhV}} - 1] + (0.75 \times \text{Corrected IhV})$$

and replace with the following:

$$\eta_{int} = 0.5 [e^{0.5 \times \text{Corrected IhV}} - 1] + (0.75 \times \text{Corrected IhV})$$

Signed and Sealed this

Fourteenth Day of July, 2009

JOHN DOLL
*Acting Director of the United States Patent and Trademark Office*